United States Patent [19]

Nakauchi et al.

[11] 4,302,751
[45] Nov. 24, 1981

[54] DRIVER CIRCUIT FOR ELECTROCHROMIC DISPLAYS

[75] Inventors: Hiroshi Nakauchi, Nara; Yasuhiko Inami, Tenri; Hisashi Uede, Wakayama; Tomio Wada, Nara, all of Japan

[73] Assignee: Sharp Kabushiki Kaisha, Osaka, Japan

[21] Appl. No.: 826,114

[22] Filed: Aug. 19, 1977

[30] Foreign Application Priority Data

Aug. 20, 1976 [JP] Japan .................................. 51-99803

[51] Int. Cl.³ .............................................. G08B 5/36
[52] U.S. Cl. .................................... 340/763; 307/297; 340/785; 340/813; 350/357
[58] Field of Search ...................... 307/264, 270, 297; 350/332, 357; 340/324 EC, 336, 763, 785

[56] References Cited

U.S. PATENT DOCUMENTS

| | | | |
|---|---|---|---|
| 3,289,092 | 11/1966 | Hanson | 307/297 X |
| 3,613,351 | 10/1971 | Walton | 350/332 X |
| 3,714,469 | 1/1973 | Uchida | 307/297 X |
| 3,950,077 | 4/1976 | Jasinski | 350/357 |
| 3,951,521 | 4/1976 | Findl | 340/324 EC |
| 4,044,546 | 8/1977 | Koike | 350/332 |
| 4,045,791 | 8/1977 | Fukai et al. | 350/332 |
| 4,057,739 | 11/1977 | Otake | 340/324 EC |

*Primary Examiner*—David L. Trafton
*Attorney, Agent, or Firm*—Birch, Stewart, Kolasch and Birch

[57] ABSTRACT

A constant-voltage circuit is interposed between a power source and a driver circuit for an electrochromic display. The constant-voltage circuit functions to compensate for variations of an output level of the power source in order to stabilize coloration and bleaching operations. Switching means are interposed between the power source and the constant-voltage circuit for placing the constant-voltage circuit in an operative condition only when the coloration operation or the bleaching operation is conducted.

10 Claims, 9 Drawing Figures

DRIVER CIRCUIT FOR ELECTROCHROMIC DISPLAYS

BACKGROUND AND SUMMARY OF THE INVENTION

The present invention relates to a drive system for an electrochromic display containing an electrochromic material held in two electrode carrying support plates, at least one of which is transparent, to manifest reversible variations in the light absorption properties when current is supplied.

The present invention relates, more particularly, to a drive system which can compensate for variations of an output level of a power source in order to stabilize coloration and bleaching operations.

An electrochromic material is one in which the color is changed by the application of an electric field or current. See, for example, L. A. Goodman, "Passive Liquid Display", RCA Report 613258.

There are two types of electrochromic displays (referred to as ECD hereinafter). The first type of ECD includes an inorganic solid film formed on electrodes, which produces color variations by the change in the opacity. The second type of ECD utilizes an electrically induced chemical reduction of a colorless liquid to produce a colored, insoluble film on a cathode surface.

It is known that the degree of the coloration of the ECD is dependent on the total amount of charges passed through a unit area. That is, the degree of the coloration of the ECD increases as the total amount of charges per unit area is increased.

Generally, there are three types of drive techniques for the ECD, that is, the constant-potential type, the constant-voltage type and the constant-current type. In these drive systems, it is required that an output level of a power source be at a fixed predetermined level in order to stabilize the coloration and bleaching operations. However, when the ECD is power supplied by a cell, there is a great possibility that the power source output level varies in a fashion depending on the operational life of the cell.

Accordingly, an object of the present invention is to provide a driver circuit for electrochromic display.

Another object of the present invention is to stabilize coloration and bleaching operation in an electrochromic display.

Still another object of the present invention is to minimize power dissipation in a driver circuit for electrochromic displays.

Yet another object of the present invention is to provide a driver circuit for an electrochromic display which is power supplied by a cell or a battery.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a constant-voltage circuit is interposed between a power source cell and a driver circuit in order to compensate for variations of an output level of the power source cell. Switching means are interposed between the power source cell and the constant-voltage circuit for placing the constant-voltage circuit in an operative condition only when the coloration operation or the bleaching operation is conducted, thereby minimizing power dissipation.

BRIEF DESCRIPTION OF THE DRAWINGS

The present invention will become clear from the detailed description given hereinbelow and the accompanying drawings which are given by way of illustration only, and thus are not limitative of the present invention and wherein.

DESCRIPTION OF THE PREFERRED EMBODIMENTS

Referring now in detail to the drawings, and to facilitate a more complete understanding of the present invention, basic structures of the ECD and the conventional driver circuits will be first described with reference to FIGS. 1 through 5.

Figure 1:
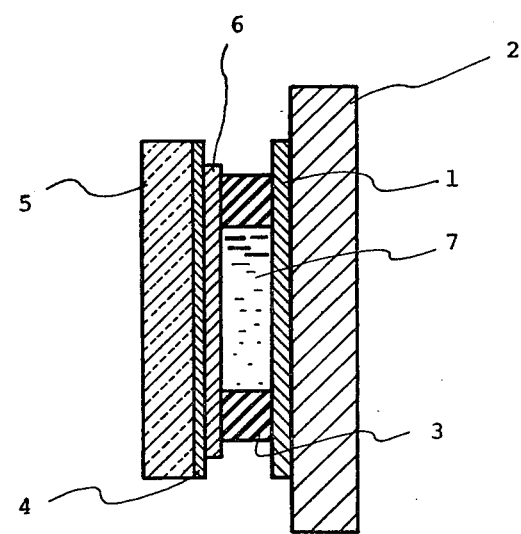
FIG. 1 is a cross sectional view of a basic structure of a solid state ECD.

There are two types of electrochromic displays referred to as ECDs. In one kind, the color variation is produced by the change in the opacity of an inorganic solid film. A typical device structure is shown in FIG. 1, wherein a layer of carbon powder added with binder (registered trademark AQUADAG) is denoted as 1, and a stainless plate is denoted as 2. Both the layer 1 and the stainless plate 2 constitute a counter electrode. A spacer is denoted as 3; a transparent electrode is denoted as 4; a glass substrate is denoted as 5; an inorganic solid film which manifests the electrochromic phenomenon is denoted as 6; and an electrolyte is denoted as 7. The inorganic film 6 most commonly used for electrocoloration is $WO_3$ with thickness of about 1 $\mu$m. The electrolyte 7 is a mixture of sulfuric acid, an organic alcohol such as glycerol, and a fine white powder such as $TiO_2$. The alcohol is added to dilute the acid and the pigment is used to provide a white reflective background for the coloration phenomenon. The thickness of the liquid is usually about 1 mm. The counter electrode is properly selected for effective operation of the device.

The amorphous $WO_3$ film is colored blue when the transparent electrode is made negative with respect to the counter electrode.

The applied voltage is several volts. The blue color is diminished or bleached when the polarity of the applied voltage is reversed. This is termed bleaching.

The coloration of the film apparently is produced by the injection of electrons and protons into the $WO_3$ film. Bleaching occurs because the electrons and protons are returned to their respective starting positions when the polarity is reversed. The colored state is maintained for several days after removal of the coloration voltage as long as the bleaching voltage is not applied (memory effects).

The second type of ECD utilizes an electrically-induced chemical reduction of a colorless liquid to produce a colored, insoluble film on the cathode surface. In the absence of oxygen, the colored film remains unchanged as long as no current flows. However, the coloration will disappear gradually in the presence of oxygen. This is termed fading. Reversing the voltage causes the film to dissolve into the liquid with the concurrent erasure of the color. The colorless liquid that has met with the most success so far is an aqueous solution of the conducting salt, KBr, and an organic material, heptylviologen bromide, which is the material that produces a purplish film upon electrochemical reduction. Typical voltages are about 1.0 VDC.

Figure 2:
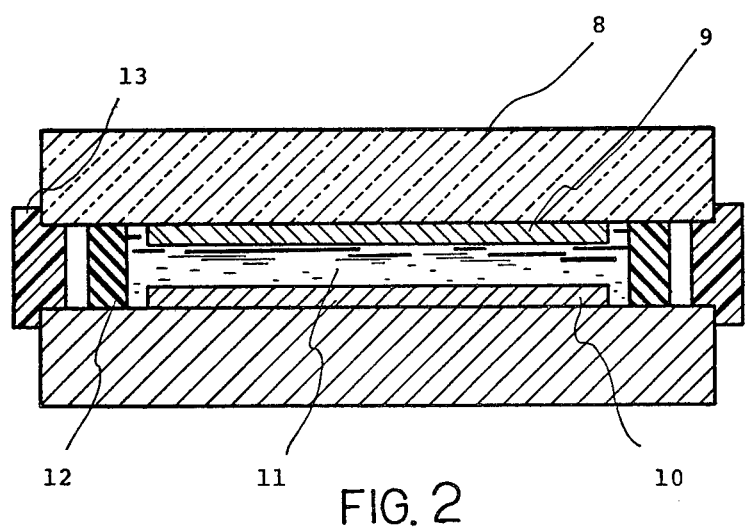
FIG. 2 is a cross sectional view of a basic structure of a liquid state ECD.

The basic cell structure is illustrated in FIG. 2. A glass substrate is denoted as 8; a counter electrode is denoted as 9; display electrodes are denoted as 10; a viologen mixture liquid is denoted as 11; a spacer is denoted as 12; and a sealing material is denoted as 13. The fluid thickness is normally about 1 mm. The viologen-based ECDs can be used in a transmissive mode if both electrodes are transparent or in a reflective mode if a white reflective pigment is mixed in the clear electrochromic liquid.

Although the operating principle of ECDs has been discussed above, ECDs have the following characteristic features.

(1) the viewing angle is extremely wide
(2) a plurality of colors are selectable
(3) for a single cycle of coloration/bleaching the power dissipation is several through several tens $mj/cm^2$, and the total power dissipation is proportional to the number of the repetition cycles
(4) memory effects are expected, which maintains the coloration state for several hours through several days after the coloration voltage is removed as long as ECDs are held in an electrically opened state. Of course, the memory effects require no externally supplied power.

Figure 3:
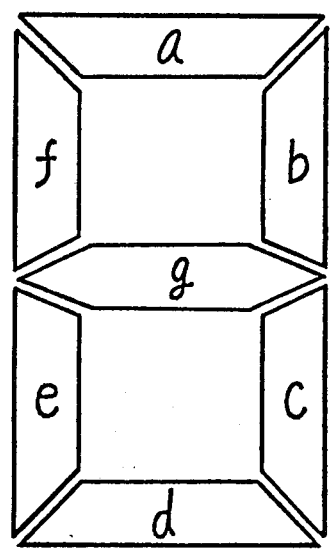
FIG. 3 is a layout of a typical seven-segment numeral display pattern.
Figure 4:
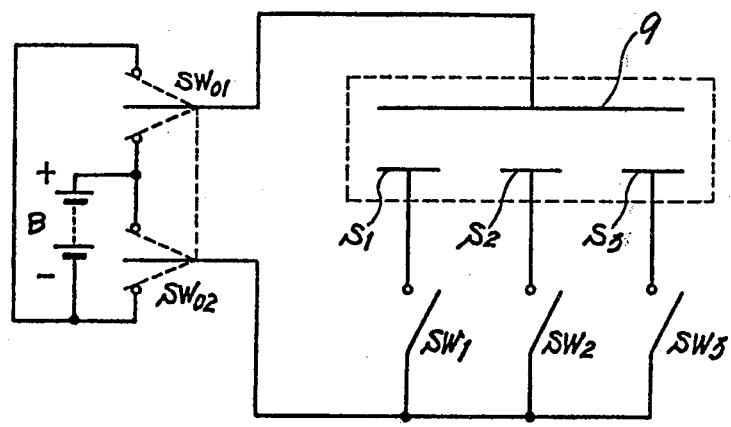
FIG. 4 is a circuit diagram of a typical driver circuit of the constant-voltage type for ECD.

By way of example, FIG. 4 illustrates a typical driver circuit of the constant-voltage type for a seven-segment numeral display utilizing the above constructed ECD of which the font is depicted in FIG. 3. Only three segments $S_1$, $S_2$ and $S_3$ are illustrated in FIG. 4 for convenience sake. The driver circuit of FIG. 4 mainly comprises a power source B, polarity selection switches $SW_{01}$ and $SW_{02}$, the switches $SW_{01}$ and $SW_{02}$ being associated with each other, and segment switches $SW_1$, $SW_2$ and $SW_3$.

When only a specific segment $S_1$ is to be colored, the selection switches $SW_{01}$ and $SW_{02}$ are inclined toward the lower terminals, respectively, and only the segment switch $SW_1$ connected to the segment $S_1$ is closed. At this moment, the electric current flows from the counter electrode 9 to the segment electrode $S_1$ through the electrolyte, thereby coloring the segment $S_1$.

Once the segment $S_1$ is sufficiently colored, at least one of the selection switches $SW_{01}$ and $SW_{02}$ is maintained at the intermediate position to terminate the flow of the electric current. The segment $S_1$ is sustained in the coloration state. Alternatively, the segment $S_1$ is also placed in the memory condition when the segment switch $SW_1$ is opened even when the selection switches $SW_{01}$ and $SW_{02}$ are remained to incline toward the lower terminals. The coloration tone can be controlled by selectively varying the ON period of the respective segment switches $SW_1$, $SW_2$ and $SW_3$.

Thereafter, when the segment $S_1$ is to be bleached, the selection switches $SW_{01}$ and $SW_{02}$ are inclined toward the upper terminals, respectively, and only the segment switch $SW_1$ connected to the segment $S_1$ is closed. At this moment, the electric current flows from the segment electrode $S_1$ to the counter electrode 9 through the electrolyte, thereby bleaching the segment $S_1$. The degree of the bleaching is also controllable by varying the ON period of the segment switch $SW_1$.

The switches of FIG. 4 can be made of electronic switches such as transistor analogue switches.

Figure 5:
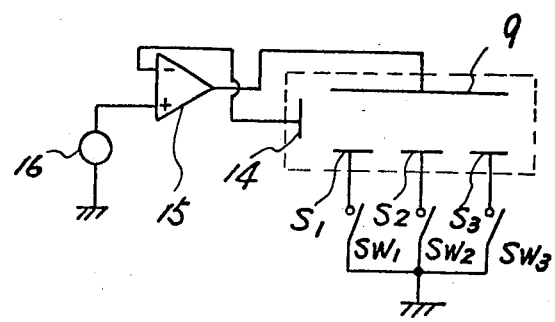
FIG. 5 is a circuit diagram of a typical driver circuit of the constant-potential type for ECD.

FIG. 5 shows a typical driver circuit of the constant-potential type for ECDs. In this case, a reference electrode 14 is formed in an ECD cell. Like elements corresponding to those of FIG. 4 are indicated by like numerals.

The driver circuit of the constant-potential type mainly comprises an operation amplifier 15 and a constant-potential supply source 16 for setting a potential of the reference electrode 14. Generally, the ECDs utilize reaction occurring at the boundary area between the electrode and the electrolyte, the reaction being caused by the current flowing through the electrolyte. To secure stable reaction, it is necessary that a potential difference between the electrode and the electrolyte is maintained at a predetermined value. The constant-potential drive system is constructed so as to create the predetermined potential difference between the electrode and the electrolyte.

When the segment $S_1$ is desired to be colored, the segment switch $SW_1$ is closed and the constant-potential supply source 16 develops a set voltage $V_{set}$ associated with coloration operation. A potential of the electrolyte is detected by the reference electrode 14 and is applied to a negative input terminal of the operation amplifier 15. Therefore, the operation amplifier 15 develops an output voltage, which is applied to the counter electrode 9, so that the reference electrode potential coincides with the set voltage $V_{set}$. In this way, the potential difference between the electrolyte and the segment electrode $S_1$ is maintained at a predetermined value determined by the set voltage $V_{set}$. After the coloration is conducted to a desired level, the segment switch $SW_1$ is opened and the ECD is placed in the memory state.

When the segment $S_1$ is desired to be bleached, the segment switch $SW_1$ is closed and the constant-potential supply source 16 develops another set voltage $-V_{set}$ associated with bleaching operation. The operation is same as that is conducted in the coloration operation. The respective set voltages $V_{set}$ and $-V_{set}$ are around $+1$ volt and $-1$ volt.

In the above-mentioned drive systems of the constant-voltage type and the constant-potential type, it is important that the power source output level is fixed at a predetermined value to secure stable or constant coloration and bleaching operations. Recently, ECDs have been desired to be employed in battery powered timepieces and battery powered portable measuring devices. The most commercially available D.C. power source is the manganese cell SUM-1. The output level of the manganese cell SUM-1 is variable from 1.5 volts to 0.9 volts in its operative condition. Therefore, a circuit means is required for compensating for the variations of the output level of the power source cell.

Figure 6:
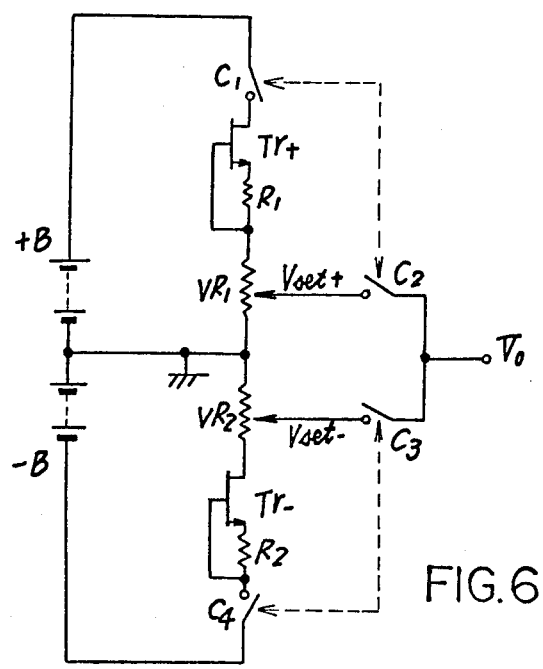
FIG. 6 is a circuit diagram of an embodiment of a constant-voltage circuit of the present invention applicable to the driver circuit of FIG. 5.

FIG. 6 shows an example of the constant-potential supply source 16 including an embodiment of a constant-voltage circuit of the present invention.

Transistors $Tr_+$ and $Tr_-$ are self-biased via resistors $R_1$ and $R_2$, respectively, the resistors $R_1$ and $R_2$ being connected between the gate electrodes and the source electrodes of the respective transistors $Tr_+$ and $Tr_-$. The transistors $Tr_{30}$ and $Tr_-$ function as constant-current elements. The constant-current output of the transistor $Tr_+$ is applied to a variable resistor $VR_1$, thereby developing a constant voltage across the variable resistor $VR_1$. The constant-current output of the transistor $Tr_-$ is applied to another variable resistor $VR_2$, thereby developing a constant voltage across the variable resistor $VR_2$. Therefore, the set voltages $V_{set}$ and $-V_{set}$ derived from the variable resistors $VR_1$ and $VR_2$ do not vary even when the output levels of power source cells $+B$ and $-B$ vary.

Switching means $C_1$ and $C_4$ are provided for controlling power supply to the transistors $Tr_+$ and $Tr_-$, respectively. Switching means $C_2$ and $C_3$ are provided for selecting the development of the set voltages $V_{set}$ and $-V_{set}$. Output signals derived from an output terminal $V_o$ are applied to the positive input terminal of the operation amplifier 15 of FIG. 5. The switching means $C_1$ and $C_2$ are associated with each other so as to simultaneously operate, and the switching means $C_3$ and $C_4$ are also associated with each other.

As already discussed above, the ECDs have memory effects and, therefore, the above-mentioned set voltages $V_{set}$ and $-V_{set}$ are required to be developed only during the coloration operation and the bleaching operation. Normal periods required for these operations are below several seconds.

Now assume that the ECDs are applied for display means of digital timepieces. The minute information display section changes its display condition once every minute and the hour information display section changes its display condition once every one hour. Therefore, the coloration and/or bleaching operation is required once every one minute, at the minute information display section of the digital timepiece. In other words, the whole segments are placed in their memory states for more than fifty seconds within a period of one minute. In the memory states, the ECDs do not require externally supplied power.

The switching means $C_1$ and $C_2$ are ON only during the coloration operation to develop the set voltage $V_{set+}$ at the output terminal $V_o$ through the transistor $Tr_+$ and the variable resistor $VR_1$. The switching means $C_3$ and $C_4$ are ON only during the bleaching operation to develop the set voltage $V_{set-}$ at the output terminal $V_o$ through the transistor $Tr_-$ and the variable resistor $VR_2$. In the memory state, the switching means $C_1$ through $C_4$ are OFF to minimize power dissipation.

Figure 7:
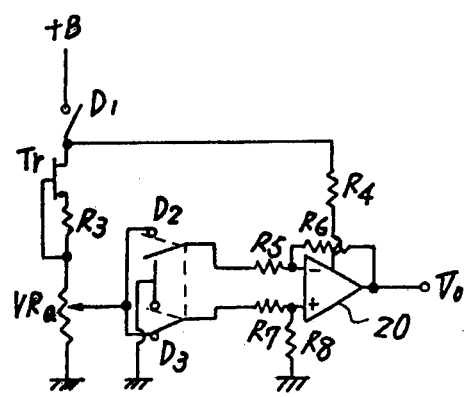
FIG. 7 is a circuit diagram of another embodiment of a constant-voltage circuit of the present invention applicable to the driver circuit of FIG. 5.

FIG. 7 shows another example of the constant-potential supply source 16 including another embodiment of a constant-voltage circuit of the present invention.

A switch $D_1$ is ON when the coloration operation or the bleaching operation is conducted. A transistor Tr is self-biased via a resistor $R_3$ which is interposed between the gate electrode and the source electrode of the transistor Tr, whereby the transistor Tr functions as a constant-current source. The constant current develops a fixed voltage across a variable resistor VRa. A programmable operation amplifier 20 receives the current through a resistor $R_4$ and functions as a linear amplifier.

During the coloration operation, associated switches $D_2$ and $D_3$ are inclined toward lower terminals. Accordingly, the operation amplifier 20 functions as a non-inverting amplifier to develop the positive set voltage $V_{set+}$ at its output terminal $V_o$. Alternatively, the associated switches $D_2$ and $D_3$ are inclined toward upper terminals during the bleaching operation. At this moment the operation amplifier 20 functions as an inverting amplifier to develop the negative set voltage $V_{set-}$ at its output terminal $V_o$. The switch $D_1$ is OFF when neither the coloration operation nor the bleaching operation is conducted, thereby minimizing power dissipation.

By properly selecting the resistance values of resistors $R_5$, $R_6$, $R_7$ and $R_8$, the ratio of absolute values of the positive and negative set voltages $V_{set+}$ and $V_{set-}$ is set at a desired value. The absolute value of the negative set voltage $V_{set-}$ is preferably selected higher than the positive set voltage $V_{set+}$ in order to ensure the complete bleaching. In FIG. 7, $+B$ represents an output voltage of the power supply cell, which is unavoidably subject to variation.

Figure 8:
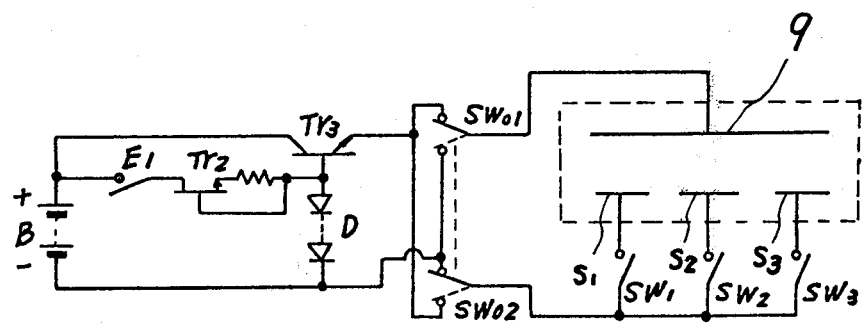
FIG. 8 is a circuit diagram of a driver circuit of the constant-voltage type employing still another embodiment of a constant-voltage circuit of the present invention.

FIG. 8 shows an example of the drive system of the constant-voltage type, which includes still another embodiment of the constant-voltage circuit of the present invention. Like elements corresponding to those of FIG. 4 are indicated by like numerals.

A switch $E_1$ is ON when either the coloration operation or the bleaching operation is conducted, whereby a transistor $Tr_2$ receives power supply from a power source cell B. The transistor $Tr_2$ functions as a constant-current source without regard to the variation of the output level of the power source cell B. The constant current derived from the transistor $Tr_2$ is converted into a constant voltage by a series connection of diodes D and, then, converted into a constant voltage of low impedance through a transistor $Tr_3$. The voltage of the diodes D has a negative temperature coefficient and, therefore, the output voltage is automatically reduced when the temperature rises in order to compensate for variations of the reaction speed of the ECD, which is advanced when the temperature rises.

Figure 9:
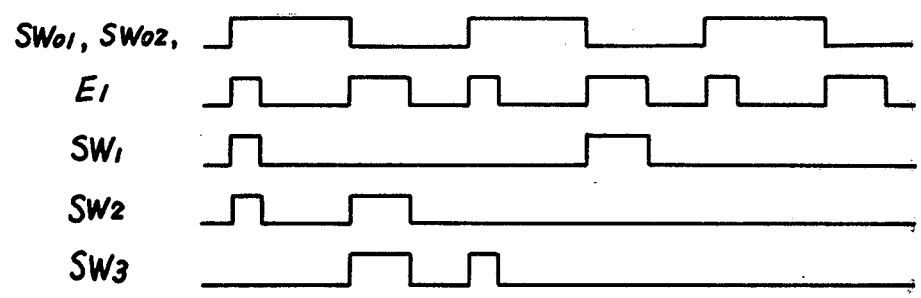
FIG. 9 is a time chart showing switching signals applied to switching elements included within the driver circuit of FIG. 8.

FIG. 9 shows switching signals to be applied to switches $SW_{01}$, $SW_{02}$, $E_1$, $SW_1$, $SW_2$ and $SW_3$ of FIG. 8.

When the signal appearing on switches $SW_{01}$, $SW_{02}$ bears the high level, the counter electrode 9 receives the positive voltage, and when the signal on switches $SW_{01}$, $SW_{02}$ bears the low level, the counter electrode 9 receives the negative voltage. The switches $E_1$, $SW_1$, $SW_2$ and $SW_3$ are ON when the switching signals on switches $E_1$, $SW_1$, $SW_2$ $SW_3$ take the high levels, respectively. And the switches $E_1$, $SW_1$, $SW_2$ and $SW_3$ are OFF when the switching signals on switches $E_1$, $SW_1$, $SW_2$ and $SW_3$ take the low levels, respectively.

When the segment $S_1$ is desired to be colored, the segment switch $SW_1$ is ON and switches $SW_{01}$, $SW_{02}$ take the high level. When the segment $S_1$ is desired to be bleached, the segment switch $SW_1$ is ON and switches $SW_{01}$, $SW_{02}$ take the low level. The switch $E_1$ is ON when at least one of the segment switches $SW_1$ through switch $SW_3$ is ON. The switch $E_1$ is OFF when every segment switch is OFF, thereby minimizing power dissipation.

The respective switches included within the circuits of FIGS. 6 through 8 can be MOS transistors or C-MOS transistors.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A drive system for an electrochromic display comprising:
   an electrochromic material held between two substrates, a plurality of display pattern segment electrodes and a counter electrode,
   each combination of said display pattern segment electrodes with said counter electrode defining a different desired display pattern;
   a power source delivering a variable current and having an output voltage level subject to variation and a driver circuit means for applying coloration and bleaching voltage signals to said display pattern segment electrodes;
   a constant voltage circuit means connected between said power source and said driver circuit for compensating for variations in said output voltage level of said power source and applying a constant voltage of a fixed level to said driver circuit to stabilize coloration and bleaching operations in said electrochromic display, said constant voltage circuit means including constant current producing transistor means responsive to the variable current delivered by said power source for producing a constant current and converting means connected to said transistor means and responsive to said constant current for producing a constant voltage; and
   switching means interposed between said power source and said constant voltage circuit means for placing said constant voltage circuit means in an operative condition only during coloration and bleaching operations.

2. The drive system for an electrochromic display of claim 1, further comprising segment selection switching means interposed between said driver circuit and said display pattern segment electrodes for selecting the desired segment electrodes undergoing coloration and bleaching operations.

3. The drive system for an electrochromic display of claim 2, wherein said switching means are in an ON condition only when at least one of said segment selection switching means are in an ON condition.

4. A drive circuit for an electrochromic display comprising:
   a power source delivering a variable current and having a voltage level output subject to variation;
   a driver circuit means for developing coloration and bleaching voltage signals to be applied to said electrochromic display;
   a constant voltage circuit means interposed between said power source and said driver circuit means for compensating for variations in a said output voltage level of said power source and applying a constant voltage of a fixed level to said driver circuit to stabilize the coloration and bleaching operation of said display, said constant voltage circuit means including constant current element means connected to said power source and responsive to said variable current delivered by said power source for providing a constant current and converting means responsive to said constant current for converting said constant current into a constant voltage; and
   switching means interposed between said power source and said constant voltage circuit means for placing said constant voltage circuit in an operative condition only during said coloration and bleaching operation and for producing first and second polarities, respectively, of said constant voltage to conduct said coloration and bleaching operations, respectively, in said electrochromic display.

5. The drive system for an electrochromic display of claim 4, wherein said second switching means comprises a plurality of polarity selection switches.

6. The drive system for an electrochromic display of claim 4, wherein said electrochromic display includes a counter electrode and a reference electrode, and wherein said driver circuit further comprises an operational amplifier having two inputs and an output, said operational amplifier being connected at its output to said counter electrode and being connected at its two inputs to said reference electrode and to an output terminal of said constant-voltage circuit means, respectively.

7. The drive system for an electrochromic display of claim 4, wherein said power source comprises a DC battery means.

8. The drive system for an electrochromic display of claim 6, wherein said constant current element means and said converting means in said constant-voltage circuit means are arranged in
   two tandemly oriented constant current loops, each loop developing said constant voltage.

9. The drive system for an electrochromic display of claim 8, wherein each said tandemly oriented constant current loop comprises said power source arranged in series with said constant current element means and said converting means; and
   wherein one of said loops develops a positive constant voltage output and the other of said loops develops a negative constant voltage output.

10. The drive system for an electrochromic display of claim 4, wherein said constant voltage circuit means further comprises:
    low impedance constant voltage producing transistor means interconnected between said converting means and said further switching means for converting said constant voltage from said converting means into a constant voltage of low impedance.

* * * * *

UNITED STATES PATENT AND TRADEMARK OFFICE
CERTIFICATE OF CORRECTION

PATENT NO. : 4,302,751
DATED : November 24, 1981
INVENTOR(S) : Take et al

It is certified that error appears in the above—identified patent and that said Letters Patent is hereby corrected as shown below:

On The Title Page, item (19), change

"Nakauchi et al." to --Take et al.--

In category "[75] Inventors", change

"Hiroshi Nakauchi" to --Hiroshi Take--

Signed and Sealed this

Twenty-fifth Day of May 1982

[SEAL]

Attest:

Attesting Officer

GERALD J. MOSSINGHOFF

Commissioner of Patents and Trademarks